July 14, 1953      A. W. TRONNIER      2,645,154

FIVE-LENS PHOTOGRAPHIC OBJECTIVE

Filed Sept. 9, 1950

INVENTOR.
ALBRECHT WILHELM TRONNIER
BY Mock & Blum
ATTORNEYS

Patented July 14, 1953

2,645,154

UNITED STATES PATENT OFFICE 2,645,154

FIVE-LENS PHOTOGRAPHIC OBJECTIVE

Albrecht Wilhelm Tronnier, Gottingen, Germany, assignor to Voigtlander & Sohn Aktiengesellschaft, Braunschweig, Germany, a corporation of Germany Application September 9, 1950, Serial No. 183,967
In Switzerland October 17, 1949

4 Claims. (Cl. 88—57)

This invention relates to a five-lens photographic objective comprising three members separated by intermediate air spaces. It has particular relation to a new and improved five-lens photographic objective of this type, in which each of the two outer members is composed of two individual lenses of opposite power, which are cemented together in such a manner that the cemented contact surface has a converging effect. Objectives of this type were first suggested and developed by H. Harting in 1899-1900 and are known in the art as Heliar-type objectives.

One of the objects of the present invention consists in providing new and improved photographic objectives showing an improved quality of the images in the lateral portions of the field of vision.

Another object of the invention is to provide new and improved Heliar-type objectives showing a particularly fine correction outside the optical axis of chromatic transverse aberrations for several colors, i. e. over a relatively wide spectral range.

Numerous other objects, advantages and features of this invention are set forth in the following description and the annexed drawings, which include a preferred example of the invention to which the invention is not limited.

Figure 1:
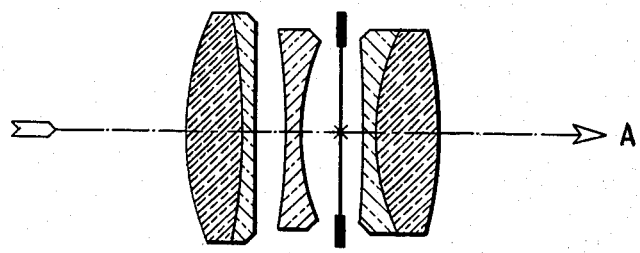

In the drawings, Figure 1 is a vertical axial section of the improved objective, taken along its optical axis. The horizontal optical axis is indicated by the horizontal arrow, which also indicates the direction of the light, from left to right. The object space is at the left of the objective, and the image space is at the right of the objective.

Figure 2:
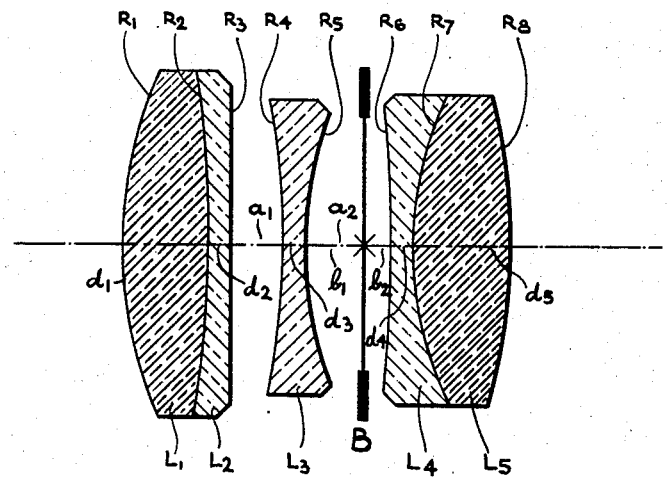

Figure 2 is a view substantially similar to that shown in Figure 1 and includes certain reference symbols explained in detail further below.

In the improved photographic Heliar-type objective of my invention the converging cemented surface in each of the two outer members is convex relative to the inner diverging lens and also relative to the diaphragm. Moreover, the surface refractive powers are not uniformly distributed to the two surfaces of the inner diverging lens. The refractive power of the latter is selected in such a manner that, in combination with the cemented front member which is arranged on the side of the longer conjugate and has a distinct converging effect, it has a relatively low negative or at most a weak positive combined refractive power, and, therefore, the course of parallel rays incident in the total system on the side of the longer conjugate shows only a weakly divergent or almost parallel or at most a weakly convergent inclination relative to the optical axis between the inner biconcave lens of unequal curvature and the subsequent strongly converging cemented member located on the side of the shorter conjugate, i. e. in the rear airspace, used mostly as diaphragm space.

The improved photographic objective of my invention is composed of five lenses and comprises the following elements arranged in the direction of light to the photographic image: (a) a front member composed of two individual lenses of opposite power, cemented together and having a cemented contact surface of converging effect, the front lens of this member being a converging lens, the index of refraction for yellow light of which is distinctly higher than 1.63, the value of the equivalent focal length of this cemented front member being in the range of 35/100 to 55/100 of the equivalent focal length of the total objective; (b) an intermediate diverging lens of unequal curvature, separated from said front member by an air-space and consisting of highly refractive barium-flint-glass, the Abbé number $\nu$ of which is higher than 42, the relative curvature of this intermediate diverging lens being defined by a quotient of its front radius and rear radius in the range of 1.87 to 2.67, the value of the focal length of said diverging lens being in the range of 20/100 to 40/100 of the equivalent focal length of the total objective; (c) an airspace containing the diaphragm; (d) a converging rear member composed of two cemented lenses of opposite power, containing a biconvex converging lens and having a converging cemented surface which is convex relative to the diaphragm, the index of refraction for yellow light of said biconvex converging lens being distinctly higher than 1.63 and the value of the focal length of said biconvex converging lens being in the range of 45/100 to 75/100 of the equivalent focal length of the total objective.

Said focal lengths are the reciprocal values of the corresponding refractive powers and are characterized for each refractive surface by the quotient obtained by division of the difference of refractive indices of the media in front of and behind the refractive surface, by the radius of curvature of said surface, i. e.

$$\frac{1}{f_i} = \varphi_i = \frac{n_i' - n_i}{R_i}$$

for any surface $i$. They form a fraction of the equivalent refractive power of the total objective and can be, therefore, defined by the radius of curvature of each surface, referred to the equivalent focal length. In this connection, the following ranges occur in objectives of my invention:

$$0.21\ F < R_1 < 0.42\ F$$
$$0.42\ F < -R_2 < 1.68\ F$$
$$F < \pm R_3 \leqq \infty$$
$$0.42\ F < -R_4 < 0.84\ F$$
$$0.20\ F < R_5 < 0.36\ F$$
$$F < \pm R_6 \leqq \infty$$
$$0.16\ F < R_7 < 0.32\ F$$
$$0.32\ F < R_8 < 0.52\ F$$

$R_4$ and $R_5$ meeting the special condition $$8.33 < \frac{R_4}{R_5} Z < 12.00''$$

In order to obtain an improved image quality in the lateral portions of the field of vision and the above-mentioned correction of chromatic transverse aberrations, in the improved photographic objective of my invention, those lenses which have the strongest individual refractive powers, i. e. primarily the converging individual lenses of the cemented outer members and the inner diverging lens, are made of barium glass, whereby, by the selection of the glass, the secondary and tertiary chromatic aberrations can be reduced. For this purpose, the two converging lenses are made of barium-crown or special-barium-crown glass, while said biconcave lens of unequal curvature is made of a barium-flint glass, whereby the advantage of the relatively proportional course of the individual partial dispersions between barium-crown and barium-flint glasses is utilized for the reduction of chromatic residual aberrations of higher order.

In order to satisfactorily meet the Schwarzschild-condition, in the new objectives according to this invention the two converging lenses in the cemented outer members are made of highly refractive glass, the index of refraction of which for yellow light is distinctly higher than 1.63, and furthermore, the inner biconcave lens of unequal curvature is made of a likewise highly refractive glass, the Abbé number $\nu$ of which is higher than 42—whereby the range of barium flints is made available for this lens. Moreover, in the objectives according to my invention this uncemented negative lens is designed to meet the condition:

$$8.33 < \frac{R_V^{III}}{R_H^{III}} \cdot Z < 12$$

wherein $$R_H^{III}$$

is the radius of the front curvature, on the side of the longer conjugate, of the inner diverging lens;

$$R_H^{III}$$

is the radius of rear curvature of the inner diverging lens on the side of the shorter conjugate and, therefore, mostly adjacent the diaphragm; and Z is the stop number of the front relative aperture of the total objective.

Thus, the general curvature factor $P_D$ of this negative lens is expressed by the formula (1) $$P_d = \frac{R_V^{III}}{R_H^{III}} \cdot Z$$

and the design according to my invention of the inner diverging barium-flint-lens of unequal curvature must meet the condition (2) $$8.33 < P_D < 12.00$$

The limits may also be expressed as follows:

(3a) $$8.33 = \frac{10}{12} \cdot 10^1$$

(3b) $$12.00 = \frac{12}{10} \cdot 10^1$$

This general curvature factor can be expressed by elimination of the stop number Z for the relative aperture f/4.5 of the example, by $$P_D' = \frac{P_D}{Z}$$

with the above mentioned limits, i. e.

$$P_D' = \frac{8.33}{4.5} = 1.87$$

as the lowest limit, and $$P_D' = \frac{12.00}{4.5} = 2.67$$

as the highest limit for the curvature of lens $L_3$

In connection with the improvement attained by my invention, it may be mentioned that objectives of the Heliar-type, in which the separate diverging lens consists of glass having an Abbé number $\nu$ close to 42 to 44, have been described previously. In these cases, however, always light flints of low refractive power were used, the index of refraction of which for yellow light was distinctly lower than 1.58. Such glasses do not show the same favorable spectral distribution of the partial dispersions in relation to that of the heavy barium- or special-barium-crowns, as the highly refractive barium-flints used according to the present invention, of which primarily those having a mean refractive index distinctly higher than 1.59, with reference to the yellow helium-line of the spectrum, are particularly suitable. The use of such special glasses of heavy refractive power permits a better correction of defects in the lateral image field, without the application of particular correction elements, such as radii of curvature, surface distances, or curvature conditions of lenses.

The new teaching of the present invention can be also established in a particularly simple manner theoretically by combining the Schwarzschild-condition with the Tronnier's equation of image flatness. Schwarzschild's condition for a system of K refractive surfaces is expressed as follows:

(4) $$S_{1_K} = \sum_{i=1}^{K} \zeta_i \left( h_i - \frac{n_M}{n_i} \right)$$

In this equation the symbols denote successively for the $i^{th}$ surface: $\zeta_i$ the paraxial surface refractive power of this surface; $h_i$ the height of incidence of the parallel auxiliary ray on this surface; $n_i$ the respective index of refraction of the glass on this surface proper and $n_M$ the mean index of refraction of the glasses used for building the total objective, which, by a formula, can be expressed for the mean value (simple arithmetical mean) as follows:

(5) $$n_M = \frac{1}{Z} \sum_{j=1}^{Z} n_j$$

In the case of a five-lens objective the denominator value is $Z=5$.

The above mentioned Schwarzschild-condition expresses for each lens surface the specific effect fraction of the image curvature of the total system and it is strictly complied with in the case of $$S_{1_K} = 1$$

whereby in the defect range of third order a complete image flattening is attained.

For any numerical value of $S_{1_K}\neq 1$, Tronnier's equation yields as a measure of the attained image flattening directly the length of the vertex radius of the residual image field curvature:

$$(6) \qquad R_S = \frac{n_M}{1-S_{1_K}}$$

wherein in accordance with Seidel's rules of signs a positive sign of the numerical value of $R_S$ means that the resulting image field shell in concave toward the region of the diaphragm, i. e. that the remaining residual aberration has the same directional tendency as effected by a simple equiconvex positive lens.

From the above Equation 6 it follows directly that in the case of any desired constructively attained degree of approximation of compliance with the Schwarzschild-condition, the attained image field flattening is directly proportional to the value of the index of refraction of the glasses used. Therefore, the introduction of glasses of heavy refractive power according to the present invention represents an essentially improved performance also for the objective-type here in question.

By this new combination of constructive and structural steps, the object of the present invention, i. e. an essential improvement of photographic objectives of the Heliar-type has been attained. Also in the case of the high relative aperture of about 1:4.5 and higher, the new objectives according to my invention show an outstanding sphero-chromatic correction and a secondary spectrum reduced to such an extent that, depending on their specific structure, these objectives are half-apochromates or even have a regular apochromatic correction.

The following table illustrates, by way of example, an embodiment of the new objectives of the present invention, which, at a relative aperture of 1:4.5, shows an anastigmatically flattened image field of almost 60°, an excellent sphero-chromatic correction and a particularly fine removal of chromatic lateral aberrations in the lateral image field.

In accordance with Figure 2, in this Example, the radii of curvature of the lens surfaces are denoted $R_1, R_2, R_3, R_4, R_5, R_6, R_7, R_8$; the axial thickness of the lenses $d_1, d_2, d_3, d_4, d_5$, and their distance by $a_1, a_2$. The diaphragm B is located on the side of the shorter conjugate in the rear airspace $a_2$. The distance of the diaphragm from the adjacent surface vertices of radii $R_5$ and $R_6$, is denoted $b_1$ and $b_2$, respectively. The glasses used are characterized by their mean index of refractive power and the Abbé number $\nu$. The lenses are denoted $L_1, L_2, L_3, L_4,$ and $L_5$ and their mean refractive indices for yellow light $n_1, n_2, n_3, n_4$ and $n_5$, respectively.

The equivalent focal length of the embodiment shown in this example is 1.0000 and the paraxial intersectional width for the object of infinite distance is denoted $p_0'$. The effective system aperture amounts to 0.2222.

A focal length of f=200 mm. has been assumed for the objective according to the invention shown in the drawing.

The beforementioned focal lengths of the three members in the following numerical example are:

$f_{1_2} = 0.431$ F
$f_3 = 0.294$ F
$f_{4_5} = 0.595$ F

The exact values of radii, lens thicknesses, and distances of the example, from which the above focal lengths result, are stated in the following table.

*Example*

[F=1.0000   1:4.5   $p_0'=0.8663$]

| | | | | |
|---|---|---|---|---|
| $R_1 = +0.29207$ | $d_1 = 0.05403$ | | $n_1 = 1.65953$ | $\nu_1 = 57.0$ |
| $R_2 = -0.84699$ | $d_2 = 0.01402$ | | $n_2 = 1.60266$ | $\nu_2 = 38.4$ |
| $R_3 = $ infinite | $a_1 = 0.03242$ | | air | |
| $R_4 = -0.63631$ | $d_3 = 0.01402$ | | $n_3 = 1.64282$ | $\nu_3 = 47.9$ |
| $R_5 = +0.27162$ | | | | |
| | $a_2 = 0.05929$ | $b_1 = 0.03885$ | diaphragm space | |
| | | $b_2 = 0.02044$ | | |
| $R_6 = -2.42415$ | | | | |
| $R_7 = +0.23511$ | $d_4 = 0.01402$ | | $n_4 = 1.60266$ | $\nu_4 = 38.4$ |
| $R_8 = -0.40597$ | $d_5 = 0.05929$ | | $n_5 = 1.66867$ | $\nu_5 = 47.5$ |

Thus, the stop number is here Z=4.5 and furthermore: $n_1 = 1.65953$ and $n_5 = 1.66867$, i. e. both indices of refraction are higher than 1.63.

The Abbé number $\nu$ of the separate inner biconcave lens is $\nu_3 = 47.9$, i. e. distinctly higher than 42. Moreover the product of the ratio of radii of this lens according to Equation 1 is $$\frac{0.63631}{0.27162} \cdot 4.5 = P_D = 10.54192$$

i. e. in the range between 8.33 and 12.00.

The dioptric effect of $L_5$ having a focal length of 0.23123 is distinctly higher than that of $L_1$ having a focal length of 0.33562.

The index of refraction of the negative lens located between the two cemented outer members is 1.64282, i. e. distinctly higher than 1.59 and also higher than 1.63.

The yellow index of refraction $n_5$ is 1.66867, i. e. distinctly higher than the index of refraction of the same color of lens $L_1$.

A preferred embodiment of this invention has been described, but numerous changes, omissions, additions and substitutions can be made without departing from its scope.

What is claimed is:

1. A photographic objective composed of five lenses, which comprises the following elements arranged in the direction of light to the photographic image: (a) a front member composed of two individual lenses of opposite power, cemented together and having a cemented contact surface of converging effect; the front lens of this member being a converging lens, the index of refraction for yellow light of which is distinctly higher than 1.63; the value of the equivalent focal length of this cemented front member being in the range of 35/100 to 55/100 of the equivalent focal length of the total objective; (b) an intermediate diverging lens of unequal curvature, separated from said cemented front member by an air-space and consisting of highly refractive barium-flint glass, the Abbé number $\nu$ of which is higher than 42; the relative curvature of this intermediate diverging lens being defined by a quotient of its front radius and rear radius in the range of 1.87 to 2.67; the absolute value of the focal length of said diverging lens being in the range of 20/100 to 40/100 of the equivalent focal length of the total objective; (c) an air-space containing the diaphragm; (d) a converging rear member composed of two cemented lenses of opposite power, containing a biconvex converging lens and having a converging cemented surface which is convex relative to the diaphragm; the index of refraction for yellow light of said biconvex converging lens being distinctly higher than 1.63 and the value of the focal length of said converging rear member being in the range of 45/100 to 75/100 of the equivalent focal length of the total objective.

2. A photographic objective composed of five lenses, which comprises the following elements arranged in the direction of light to the photographic image: (a) a front member composed of two individual lenses of opposite power, cemented together and having a cemented contact surface of converging effect; the front lens of this member being a converging lens, the index of refraction for yellow light of which is distinctly higher than 1.63; the value of the equivalent focal length of this cemented front member being in the range of 35/100 to 55/100 of the equivalent focal length of the total objective; (b) an intermediate diverging lens of unequal curvature, separated from said cemented front member by an air-space and consisting of highly refractive barium-flint glass, the Abbé number $\nu$ of which is higher than 42; the relative curvature of this intermediate diverging lens being defined by a quotient of its front radius and rear radius in the range of 1.87 to 2.67; the absolute value of the focal length of said diverging lens being in the range of 20/100 to 40/100 of the equivalent focal length of the total objective; (c) an air-space containing the diaphragm; (d) a converging rear member composed of two cemented lenses of opposite power, containing a biconvex converging lens and having a converging cemented surface which is convex relative to the diaphragm; the index of refraction for yellow light of said biconvex converging lens being distinctly higher than 1.63 and the value of the focal length of said converging rear member being in the range of 45/100 to 75/100 of the equivalent focal length of the total objective; said focal lengths being the reciprocal values of the corresponding refractive powers, and being in the following ranges for the individual refractive surfaces:

$$0.21\ F<R_1<0.42\ F$$
$$0.42\ F<-R_2<1.68\ F$$
$$F<\pm R_3\leq\infty$$
$$0.42\ F<-R_4<0.84\ F$$
$$0.20\ F<R_5<0.36\ F$$

$R_4$ and $R_5$ meeting the special condition $$8.33<\frac{R_4}{R_5}\cdot Z<12.00$$
$$F<\pm R_6\leq\infty$$
$$0.16\ F<R_7<0.32\ F$$
$$0.32\ F<-R_8<0.52\ F$$

wherein F is the equivalent focal length of the total objective, $R_1$, $R_2$, $R_3$, $R_4$, $R_5$, $R_6$, $R_7$, and $R_8$, are the radii of the respective lens surfaces given in terms of the focal length (F) of the objective as a whole, and Z is the stop number of the front aperture of the total objective.

3. A photographic objective composed of five lenses, which comprises the following elements arranged in the direction of light to the photographic image: (a) a front member composed of two individual lenses of opposite power, cemented together and having a cemented contact surface of converging effect; the front lens of this member being a converging lens, the index of refraction for yellow light of which is distinctly higher than 1.63; the value of the equivalent focal length of this cemented front member being about 43/100 of the equivalent focal length of the total objective; (b) an intermediate diverging lens of unequal curvature, separated from said cemented front member by an air-space and consisting of highly refractive barium-flint glass, the Abbé number $\nu$ of which is higher than 42; the relative curvature of this intermediate diverging lens being defined by a quotient of its front radius and rear radius in the range of 1.87 to 2.67; the absolute value of the focal length of said diverging lens being about 29/100 of the equivalent focal length of the total objective; (c) and air-space containing the diaphragm; (d) a converging rear member composed of two cemented lenses of opposite power, containing a biconvex converging lens and having a converging cemented surface which is convex relative to the diaphragm; the index of refraction for yellow light of said biconvex converging lens being distinctly higher than 1.63 and the value of the focal length of said converging rear member being about 59/100 of the equivalent focal length of the total objective.

4. A photographic objective composed of five lenses, which comprises the following elements arranged in the direction of light to the photographic image: (a) a front member composed of two individual lenses of opposite power, cemented together and having a cemented contact surface of converging effect; the front lens of this member being a converging lens, the index of refraction for yellow light of which is distinctly higher than 1.63; the value of the equivalent focal length of this cemented front member being about 43/100 of the equivalent focal length of the total objective; (b) an intermediate diverging lens of unequal curvature, separated from said cemented front member by an air-space and consisting of highly refractive barium-flint glass, the Abbé number $\nu$ of which is higher than 42; the relative curvature of this intermediate diverging lens being defined by a quotient of its front radius and rear radius in the range of 1.87 to 2.67; the absolute value of the focal length of said diverging lens being about 29/100 of the equivalent focal length of the total objective; (c) an air-space containing the diaphragm; (d) a converging rear member composed of two cemented lenses of opposite power, containing a biconvex converging lens and having a converging cemented surface which is convex relative to the diaphragm; the index of refraction for yellow light of said biconvex converging lens being distinctly higher than 1.63 and the value of the focal length of said converging rear member being about 59/100 of the equivalent focal length of the total objective; said focal length being the reciprocal values of the corresponding refractive powers and having the following values for the individual refractive surfaces:

$R_1$ being about $+\frac{30}{100} F$ $R_2$ being about $-\frac{85}{100} F$ $R_3$ being about $\pm \infty$ (flat)

$R_4$ being about $-\frac{65}{100} F$ $R_5$ being about $+\frac{30}{100} F$ $R_6$ being about $-\frac{250}{100} F$ $R_7$ being about $+\frac{25}{100} F$ $R_8$ being about $-\frac{40}{100} F$ wherein F is the equivalent focal length of the total objective, $R_1$, $R_2$, $R_3$, $R_4$, $R_5$, $R_6$, $R_7$ and $R_8$, are the radii of the respective lens surfaces given in terms of the focal length (F) of the objective as a whole.

ALBRECHT WILHELM TRONNIER.

References Cited in the file of this patent

UNITED STATES PATENTS

| Number | Name | Date |
|---|---|---|
| 716,035 | Harting | Dec. 16, 1902 |
| 765,006 | Harting | July 12, 1904 |
| 1,421,156 | Booth | June 27, 1922 |
| 2,279,384 | Altman | Apr. 14, 1942 |
| 2,417,736 | Cox | Mar. 18, 1947 |

FOREIGN PATENTS

| Number | Country | Date |
|---|---|---|
| 535,480 | Great Britain | Apr. 10, 1941 |
| 601,837 | Great Britain | May 13, 1948 |